(12) United States Patent
Pappalardo et al.

(10) Patent No.: US 6,943,706 B2
(45) Date of Patent: *Sep. 13, 2005

(54) PROCESS AND DEVICES FOR TRANSMITTING DIGITAL SIGNALS OVER BUSES AND COMPUTER PROGRAM PRODUCT THEREFORE

(75) Inventors: Francesco Pappalardo, Paterno (IT); Giuseppe Notarangelo, Putigano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 54 days.

This patent is subject to a terminal disclaimer.

(21) Appl. No.: 10/670,762

(22) Filed: Sep. 25, 2003

(65) Prior Publication Data

US 2004/0131085 A1 Jul. 8, 2004

(30) Foreign Application Priority Data

Sep. 25, 2002 (EP) .............................. 02425576

(51) Int. Cl.⁷ ................................................. H03M 7/00
(52) U.S. Cl. ...................... 341/50; 714/775; 375/240.05
(58) Field of Search ............................ 341/50; 375/254, 375/240.05; 382/242; 714/25, 775, 792

(56) References Cited

U.S. PATENT DOCUMENTS

| | | | | |
|---|---|---|---|---|
| 4,007,421 A | * | 2/1977 | Lien | 375/254 |
| 4,020,463 A | * | 4/1977 | Himmel | 382/242 |
| 5,084,891 A | * | 1/1992 | Ariyavisitakul et al. | 714/775 |
| 5,651,015 A | * | 7/1997 | Bain | 714/775 |
| 5,719,632 A | * | 2/1998 | Hoang et al. | 375/240.05 |
| 6,269,454 B1 | * | 7/2001 | Mann et al. | 714/25 |
| 6,504,493 B1 | * | 1/2003 | Burd | 341/50 |
| 6,606,728 B1 | * | 8/2003 | Aziz | 714/792 |

FOREIGN PATENT DOCUMENTS

| | | |
|---|---|---|
| JP | 9-69075 | 3/1997 |
| WO | WO 02/39290 A2 | 5/2002 |

* cited by examiner

*Primary Examiner*—Jean Bruner Jeanglaude
(74) *Attorney, Agent, or Firm*—Lisa K. Jorgenson; Timothy L. Boller; Seed IP Law Group LLP

(57) ABSTRACT

Digital signals are transmitted on a bus at given instants selectively in a non-encoded format and an encoded format so as to minimize the switching activity on the bus. Given the same value of switching activity, the decision whether to transmit the signals in non-encoded format or in encoded format is taken according to the choice of maintaining constant, without transitions, the value of the additional signal, which signals that encoding of the signals transmitted each time has taken place or has been omitted.

43 Claims, 13 Drawing Sheets

US 6,943,706 B2

PROCESS AND DEVICES FOR TRANSMITTING DIGITAL SIGNALS OVER BUSES AND COMPUTER PROGRAM PRODUCT THEREFORE

BACKGROUND OF THE INVENTION

1. Field of the Invention

The present invention relates to techniques for encoding data and tackles in a specific way the problem of encoding digital signals that are to be transmitted on a bus, the chief purpose being to reduce the transitions of the signal levels on the bus, i.e., what, in the sector is generally referred to as "switching activity" (SA).

2. Description of the Related Art

To reduce transitions, and consequently switching activity on buses, a known solution is to resort to various encoding techniques. The technique currently referred to as the bus-inverter (BI) technique is considered the solution most suitable for buses of small size, for example of up to 8 bits, even though the results may vary according to the type of data processed.

The bus-inverter technique implements an encoding based upon the logical inversion of the bits of the signals transmitted and uses an additional bus-line, designated by INV, to indicate to the receiver whether the datum sent is inverted or not.

Designated by D(t) is the datum that it is intended to transmit and by B(t) the corresponding datum that travels on the bus at a generic instant in time t. The working principle underlying the bus-inverter technique is essentially represented by the logic expression:

$(B(t), INV(t))=(D(t), 0)$ if $H(D(t), B(t-1)) \leq n/2$ $(NOT(D(t)),1)$ in the other cases.

In the expression appearing above, n indicates the dimension of the bus expressed in number of bits, whilst the operator H(.) indicates a distance operator, such as, for example, the Hamming distance. The symbol NOT(.) indicates of course the logic-inversion operation ($0 \rightarrow 1$, $1 \rightarrow 0$).

Basically, the decision as regards whether to invert or not to invert the datum is taken by calculating the distance between the datum D(t) that it is intended to send at the instant t and the datum B(t−1) used for transmission on the bus for the preceding instant of transmission.

The technique described above is used also in variants like the one referred to as "Adapted Partial Bus Inverter" (APBI). With this technique, developed above all for use on buses of large dimensions, the number of bits to which the bus-inverter technique is to be applied is reduced by means of masks. These are masks that are kept fixed for an entire transmission window and calculated by means of an estimate made on the type of data to be transmitted. This involves considerable processing times and the need to resort to a circuit of a rather complicated type for the calculation/estimation of the mask.

BRIEF SUMMARY OF THE INVENTION

The present invention improves upon the techniques described above.

The invention also regards the corresponding encoding and decoding devices, as well as the corresponding computer products, which are directly loadable into the internal memory of a computer and comprise portions of software code that are able to implement the procedure and/or the devices according to the invention when said computer products are run on a computer.

An embodiment of the invention verifies occurrence of a condition in which transmission in non-encoded format and transmission in encoded format are liable to give rise to an identical switching activity on the bus, the aim being to choose the format (non-encoded/encoded) to be transmitted in such a way as to cause the associated additional signal (INV), designed to indicate the presence or absence of encoding, to preserve its previous logic value without being subject to transition.

BRIEF DESCRIPTION OF THE DRAWINGS

The invention will now be described, purely by way of non-limiting example, with reference to the annexed drawings, in which.

DETAILED DESCRIPTION OF THE INVENTION

Figure 1:
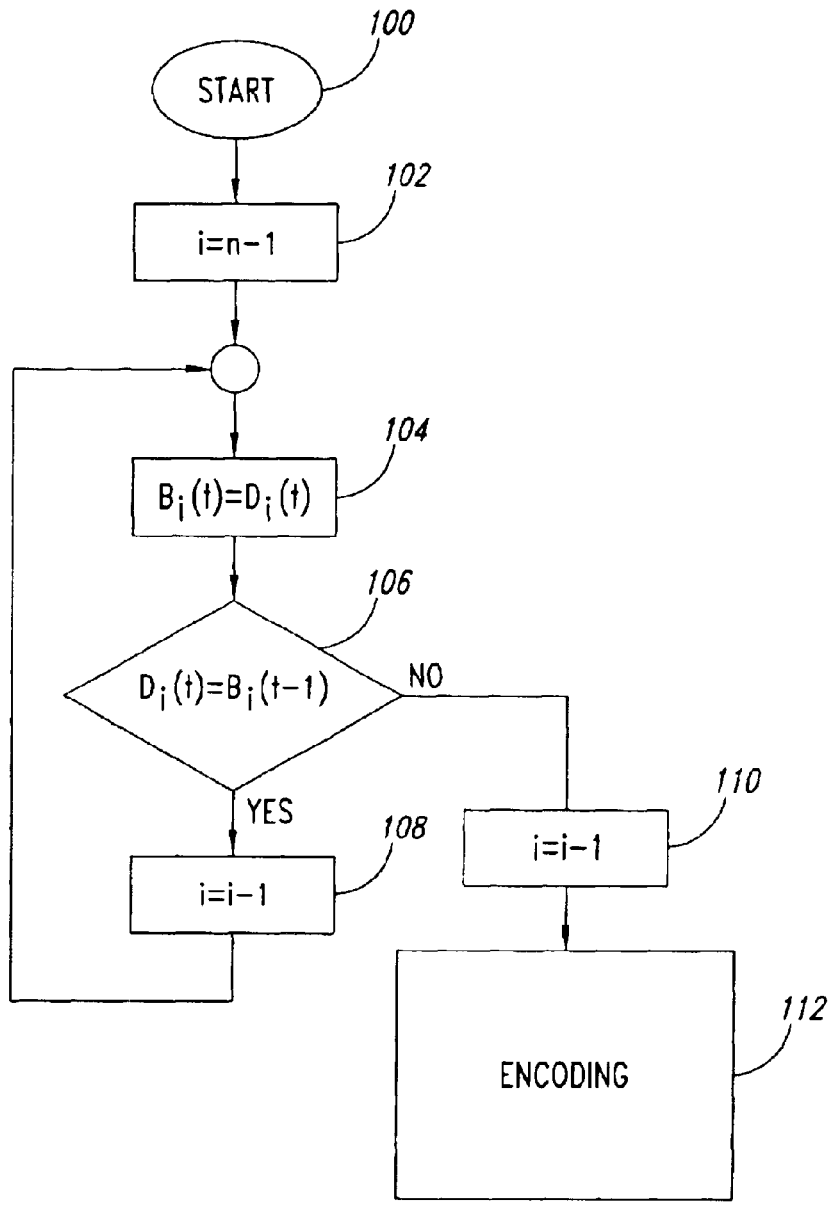
FIG. 1 is a flowchart illustrating transmission of digital signals on a bus.

The flowchart of FIG. 1 illustrates a first encoding solution applicable to a datum D(t) designed to be transmitted on a bus P (FIG. 3), and B(t) designates, as a whole, the corresponding signal actually transmitted on the bus P.

The foregoing is with reference to an instant in time t.

Consequently, by B(t−1) is designated the signal used for the transmission on the bus for a preceding instant in time, indicated by t−1. In practice B(t−1) is the value that can be found on the bus when it is necessary to transmit D(t).

The datum D(t) is made up of n bits ($D_{n-1}$, $D_{n-2}$ ..., $D_1$, $D_0$), whilst the bus P comprises n+1 bits: the bus comprises, in fact, also the line for the transmission of an additional signal INV designed to indicate whether the datum transmitted on the bus has undergone inversion (or, in general, encoding) in order to minimize the switching activity (SA) on the bus P.

As has been seen previously, with the bus-inverter technique of a traditional type, the datum is encoded (i.e., subjected to inversion on all the bits that make it up) if the distance between the signal D(t) and the signal B(t−1), detected on all the n bits, is less than n/2.

Instead, in a first example of embodiment of the technique described herein, starting from a start step designated by 100, in a step designated by 102 the procedure starts from the most significant bit (MSB) of D(t), referred to as $D_{n-1}(t)$, which is sent without encoding on the bus in a step designated in general by 104.

In a next step, 106, a check is then made to determine whether $D_{n-1}(t)$ is equal to the most significant bit of B(t−1), namely $B_{n-1}(t-1)$.

If equality is found (positive outcome from step 106), then the system goes to step 108, in which the index i is decremented, and the sequence of steps 104 and 106 seen previously is repeated with the decremented index.

This mode of procedure is equivalent to making, according to an orderly sequence (for example, starting from the most significant bit), a comparison, bit by bit, between D(t) and B(t−1). This is done by taking, one after another, the various bits of the datum D(t), proceeding in orderly sequence from the most significant bit to the least significant bit and continuing to send, on the bus P, the bits of D(t), without encoding, until, in step 106, identity between the bit of the signal or datum D(t) and the corresponding bit of the signal B(t−1) considered each time for the comparison a continues to be found.

As soon as an inequality is found (which, it is emphasized, may occur even at the first execution of the step 106), the bit in which the inequality occurs is assumed as marker bit, and the system goes to a step 110 of decrement of the current index i, and then proceeds, in a step designated by 112, to the encoding (for example using the bus-inverter technique of a traditional type) of the subset of remaining bits.

One of skill in the art, after review of the specification, will recognize that additional factors may be employed in deciding whether to encode a given bit in a digital signal. For example, the datum may be encoded when the aforesaid distance value H is less than M/2, where M is the position (from 0 to n−1) of the marker bit identified in the step designated by 106, but not encoded when the distance value is equal to or greater than M/Z.

With the technique described herein, for M other than (n−1) a switching activity less than or equal to that of the bus-inverter technique of a traditional type may be achieved. However, for M=(n−1), the switching activity with the solution described herein may be greater than 1 as compared to that of the bus-inverter technique of a traditional type. The particular case M=(n−1) is found, however, only in the case where the most significant bit of the datum D changes with respect to the current value on the bus P.

The experience deriving from a practical application of the embodiment described previously shows that, with a configuration or pattern of data considered in a random manner, the embodiment just described in any case enables a reduction of the switching activity SA in the region of 51% as compared to the results obtainable using the bus-inverter technique of a traditional type.

In the presence of particular configurations of data (for example, data that represent a digital ramp i.e., a number increasing from 0 to 255), the embodiment just described enables a reduction in the switching activity to be obtained in the region of 83% as compared to the bus-inverter technique of a traditional type.

Figure 2:
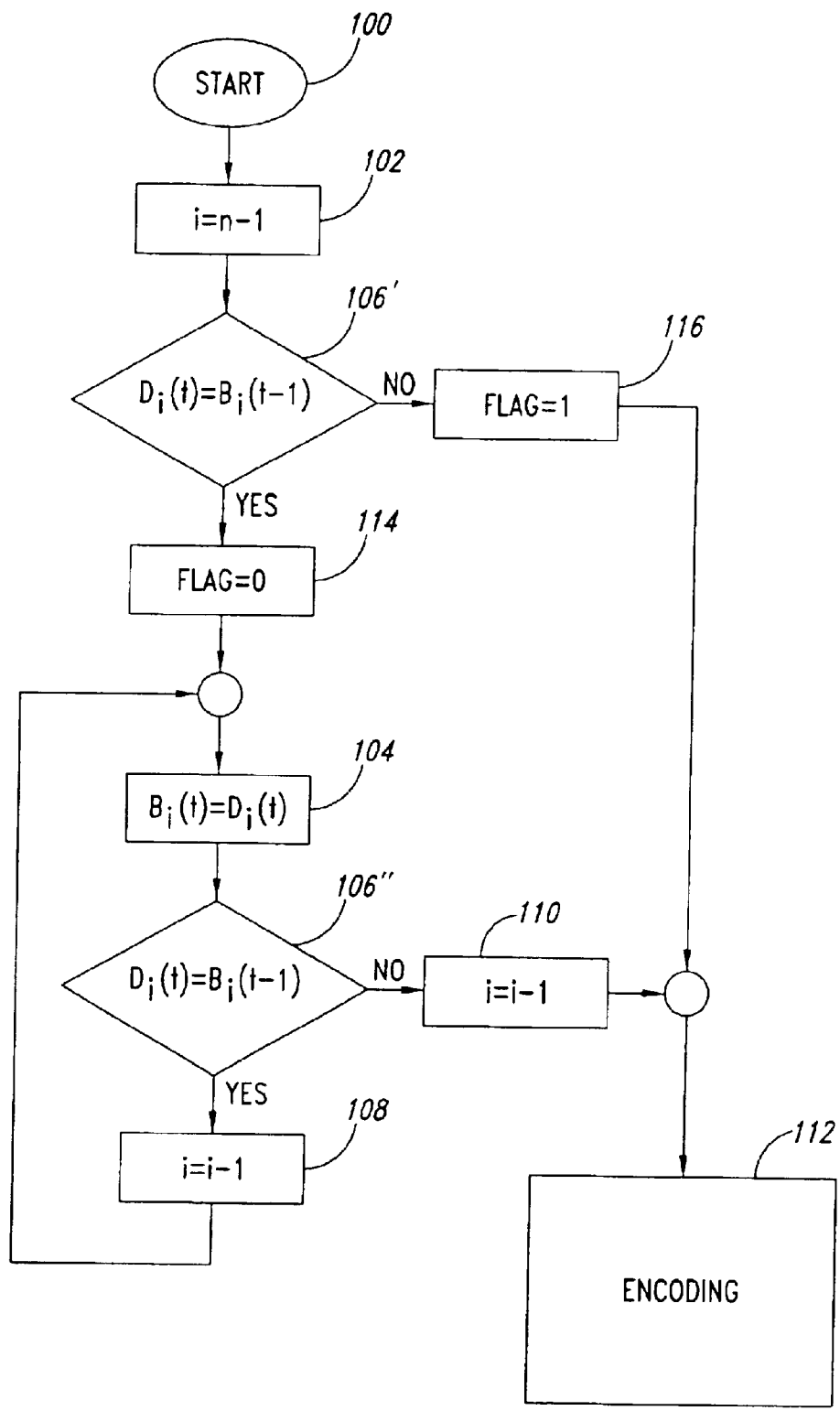
FIG. 2 is a another flowchart illustrating transmission of digital signals on a bus.

A further improvement may be achieved by resorting to the variant embodiment represented in FIG. 2.

Basically, the embodiment of FIG. 2 handles the case of M=n−1 apart, distinguishing it from the cases in which M<n−1 and applying in the first case a technique of a traditional type and in the other cases the embodiment described previously with reference to FIG. 1.

The adoption of the embodiment according to FIG. 2 involves transmission of the further information. This may be done using a three-level signal INV, for example 0, 0.5 and 1, and encoding, in an optimal way, the value 0 for the non-encoding, the value 0.5 for the encoding in the case of the innovative solution described herein, and the value 1 for encoding of a traditional type, i.e., the inversion of the whole datum because M=n−1. Inversion of the datum, i.e., its encoding, is preferably performed only in the case where the encoded case transmitted on the bus has a switching activity less than its non-encoded value.

Also in this case, D designates the datum that is to be sent and B the datum that is actually transmitted on the bus.

Consequently, D(t) identifies the datum that is to be sent at the instant t, whilst B(t−1) is the datum actually transmitted, corresponding to the instant t−1, i.e., in practice, the value that is found on the bus when it is necessary to transmit D(t). As in the preceding case, B(t) represents the expression of the datum D(t) actually encoded used for transmission on the bus at the instant t.

Also in this case it is assumed that the datum D(t) is made up of n bits and the bus P consists of n+1 bits, taking into account the additional bit required for the signal INV.

In the flowchart of FIG. 2, steps that are identical or equivalent to the ones already described with reference to FIG. 1 are designated using the same reference numbers.

Also in the case of the embodiment represented in FIG. 2, starting from a start step designated by 100, in step 102 the most significant bit of D(t) is identified, and the process then passes on to a first comparison step 106' reserved to the aforesaid most significant bit, aimed at verifying whether the said most significant bit $D_{n-1}(t)$ is equal to the most significant bit of B(t−1), i.e., $B_{n-1}(t-1)$.

If the step 106' yields a positive result, indicating the fact that the two bits compared are equal, the bit involved is sent, just as it is, on the bus, there also being set, in a step designated by 114, a corresponding identifier flag (Flag=0).

At this point, there is cyclically set under way the sequence of steps 104, 106" and 108 according to the same modalities described previously in FIG. 1, with the difference represented by the fact that the said sequence of steps is carried out (proceeding step by step towards the least significant bits), taking into account that the most significant bit has already been processed, apart, in the step designated by 106'.

Consequently, also in this case the bits of the signal D(t) are sent on the bus P just as they are, without them being encoded, i.e., without them being inverted, until the step 106" confirms the equality with the bits of B(t−1).

If, starting from a given bit, the step 106' yields a negative result, the corresponding bit becomes a marker bit, and the (sub)set of bits that remain is subjected to encoding (for example, being processed using the classic bus-inverter technique—step 112).

Direct evolution towards the step 112 is obtained, instead, already starting from step 106' in the case where the inequality is detected at the most significant bit. This corresponds to a negative result of the comparison step 106' and to the subsequent setting, in a step designated by 116, of a flag (Flag=1) with a value different from that of the flag (Flag=0) set in the step 114.

In step 112, there is also the generation of the bit INV according to the following law:

if the signal D(t) is not—even partially—to be encoded, INV is set equal to 0, if it is necessary to encode, i.e., to invert (at least in part) the signal D(t), INV is set equal to 0.5 or equal to 1 according to whether the flag referred to above is set at 0 (step 114) or at 1 (step 116).

The variant embodiment represented in FIG. 2 presents all the advantages of the embodiment already described previously with reference to FIG. 1, with the additional advantage represented by the fact that, in the particular case of M=n−1, in any case also the reduction in the switching activity related to the most significant bit is recovered because we return to encoding of a traditional type (for example, using the bus-inverter technique).

Figure 3:
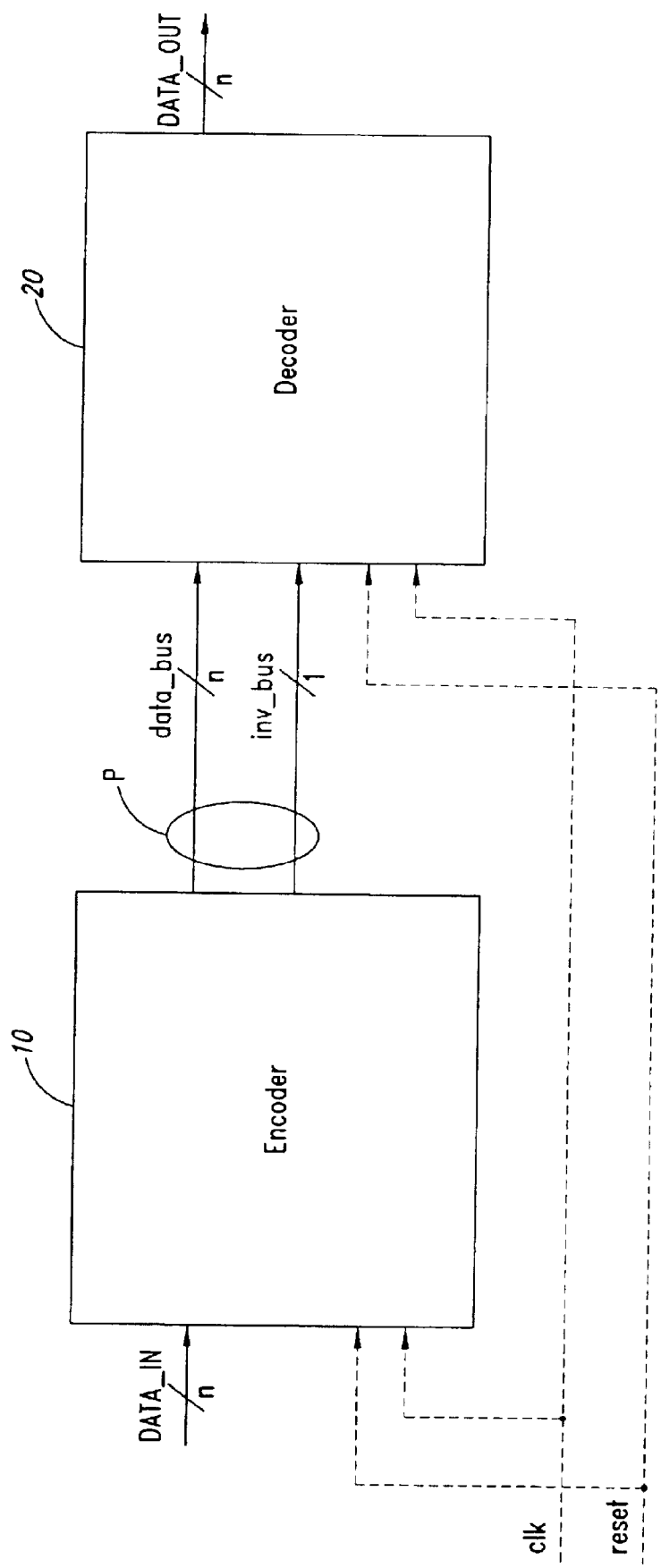
FIG. 3 represents, in the form of a block diagram, a corresponding encoder/bus/decoder system.

The block diagram of FIG. 3 illustrates the general structure of a system that is able to operate with the variants illustrated in FIGS. 1 and 2. Represented in the block diagram of FIG. 3 are a circuit encoder 10 and a circuit decoder 20 set, respectively, at the input end and at the output end of a bus designated by P. The said bus P comprises, in general, n data bits (data bus) plus an additional bit for transmission of the signal INV (inv_bus).

The symbols DATA_IN and DATA_OUT of course indicate the input data and output data with respect to the transmission on the bus P. The said transmission occurs under the clocking of a clock signal clk sent both to the encoder 10 and to the decoder 20, under which there also comes a general reset line (reset).

Figure 4:
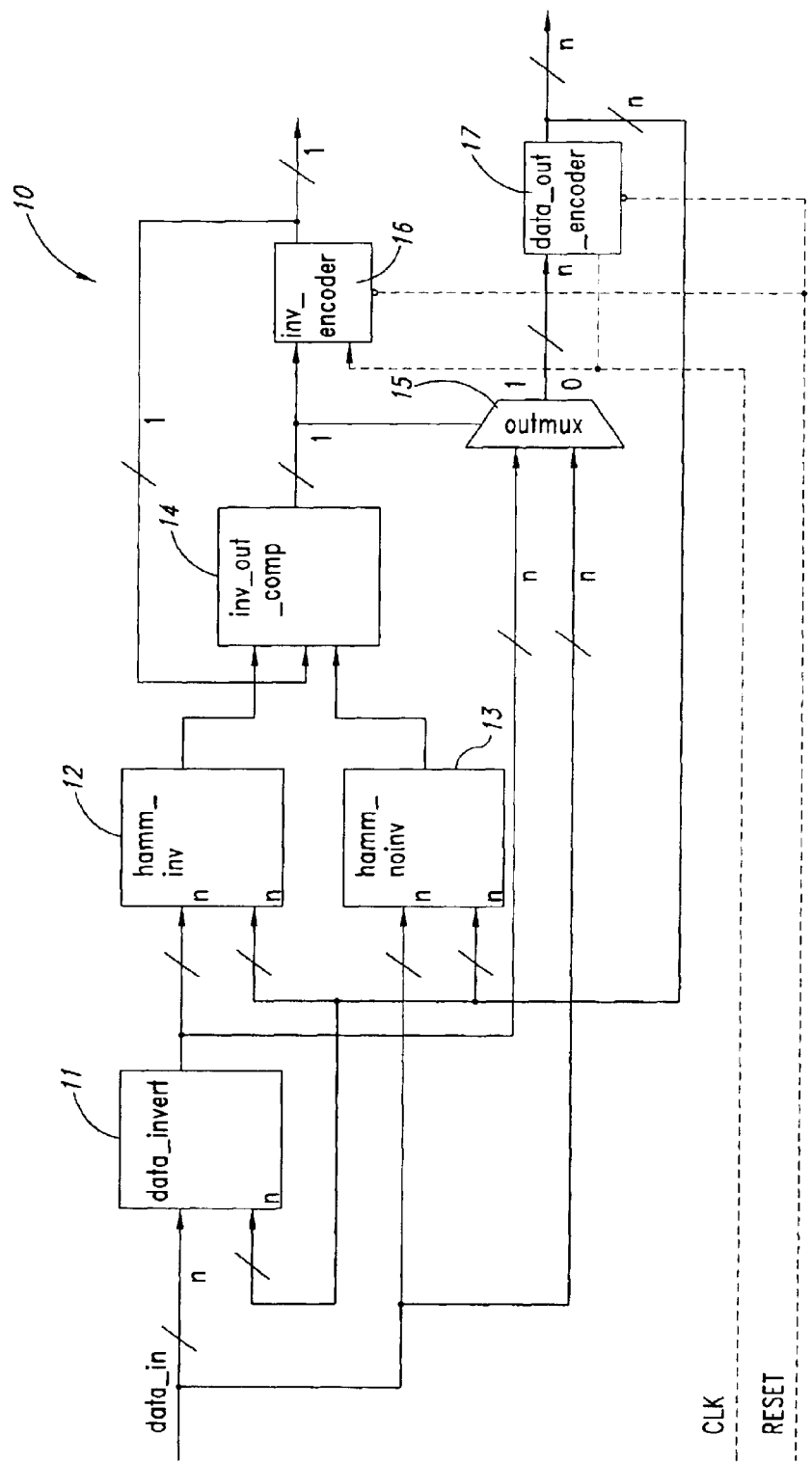
FIG. 4 is a block diagram corresponding to an encoder that can be comprised in a system such as the system represented in FIG. 3.

The block diagram of FIG. 4 represents an embodiment of the encoder 10 in greater detail.

The reference 11 designates a module designed to carry out the encoding of the datum to be transmitted (in practice, in the example to which reference is made herein, its logic inversion: 0→1, 1→0).

The blocks 12 and 13 carry out, both in an inverted connection and in a non-inverted connection, calculation of the Hamming distance between two strings of n bits.

The purpose of this is to detect the number of different bits between:

the input datum D(t), represented by the signals data_in (non-inverted format) and data_invert (inverted format); and the datum used for transmission on the bus for the preceding instant, i.e., the value B(t−1) fetched from the output line data_out_encoder.

Block 14 compares the value of the two Hamming distances calculated in the modules 12 and 13 and indicates at output which of these has the lower value. The corresponding result is used for driving an n-bit multiplexer 15 designed to transfer to the output the non-inverted input signal, or the inverted input signal, received at output from the module 11 according to the outcome of the comparison made in block 14.

The reference numbers 16 and 17 indicate two flip-flops designed to implement physically the duration of the individual time interval that separates the instants designated, respectively, by t−1 and t.

In addition to representing the output of the encoder, the output of the flip-flop 17 is also brought back to the input of the blocks 12 and 13 according to the modalities described previously. The output of the flip-flop 16 is instead brought back to the input of the comparison module 14. The aim of this is that, if the two Hamming distances calculated in the modules 12 and 13 are found to be equal, the value of the bit INV to be sent on the bus will remain equal to the preceding one. In fact, in this case, it makes absolutely no difference whether the data is sent inverted or not on the bus, and hence the choice is determined by the preceding value of INV so as to prevent switching of said bit. As useful reference, the code of the algorithm of the block 14 in FIG. 8 may be considered.

Figure 5:
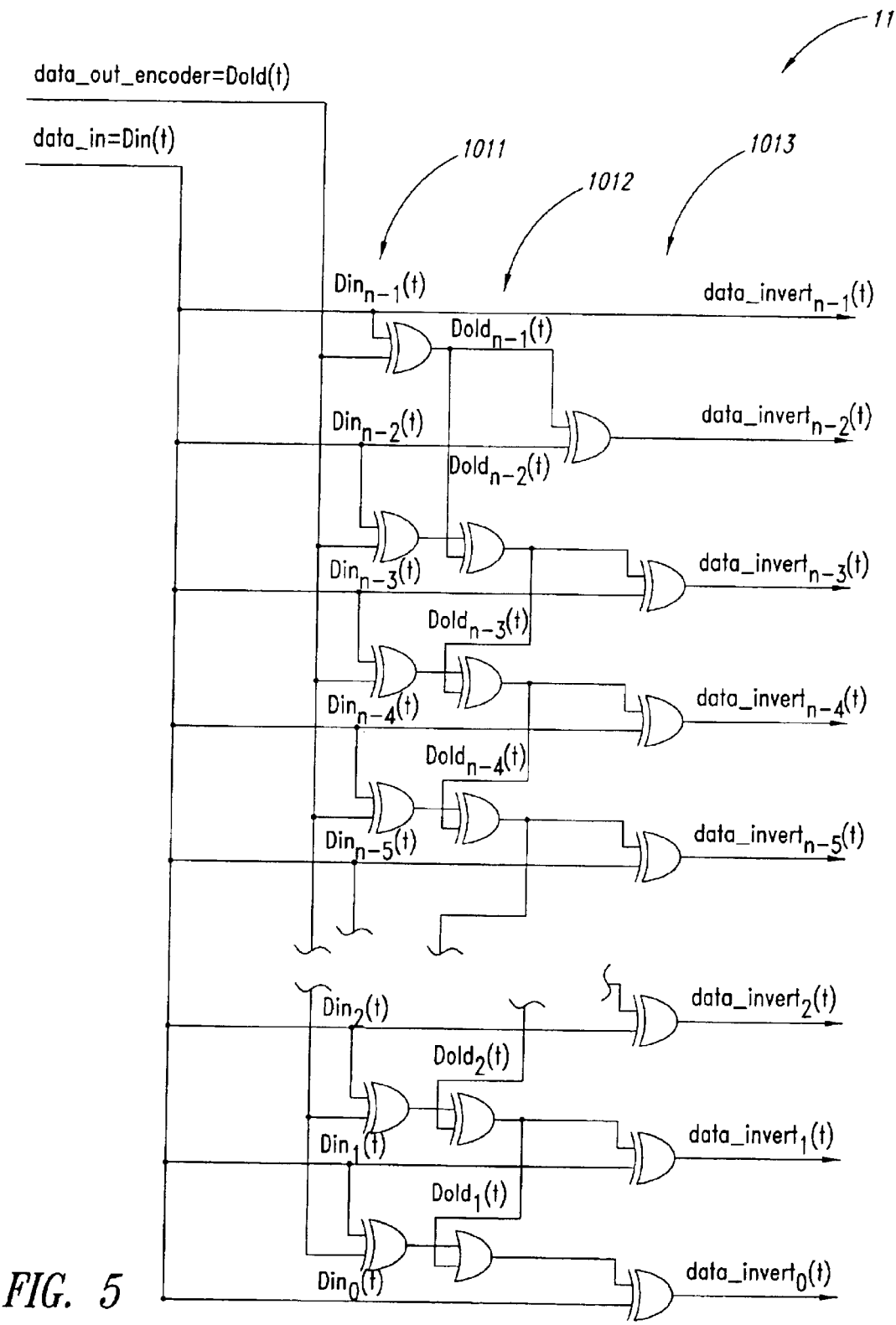
FIGS. 5, 6, 7 and 8 represent, in greater detail, elements comprised in the diagram of FIG. 4.

The diagram of FIG. 5 represents, at the level of logic gates, a possible implementation of the module designated by 11 in FIG. 4.

The reference numbers 1011, 1012 and 1013 represent respective arrays of logic gates of the EX-OR, AND (NAND) and again EX-OR types, which are designed to implement selectively the inversion of the bits of the input datum D(t) according to the value (detected bit by bit) of the signal data_out_encoder.

It will be appreciated that the representation of FIG. 5, which is altogether evident for a person skilled in the sector after review of the specification, constitutes only one of the possible variant embodiments (which are practically infinite) that enable the same result to be obtained.

Figure 6:
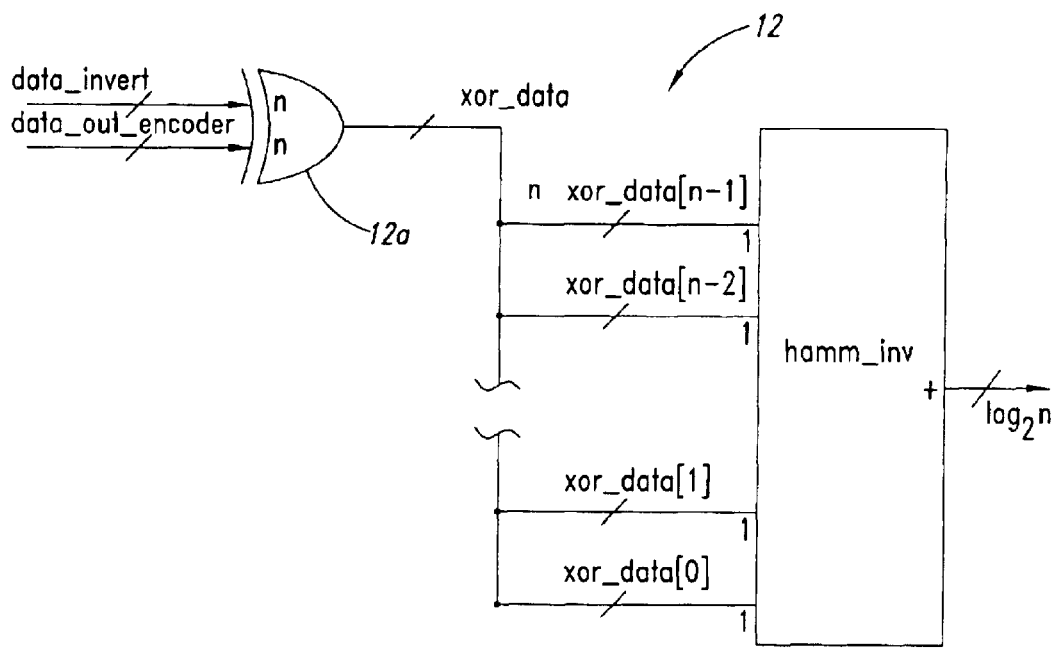
Figure 7:
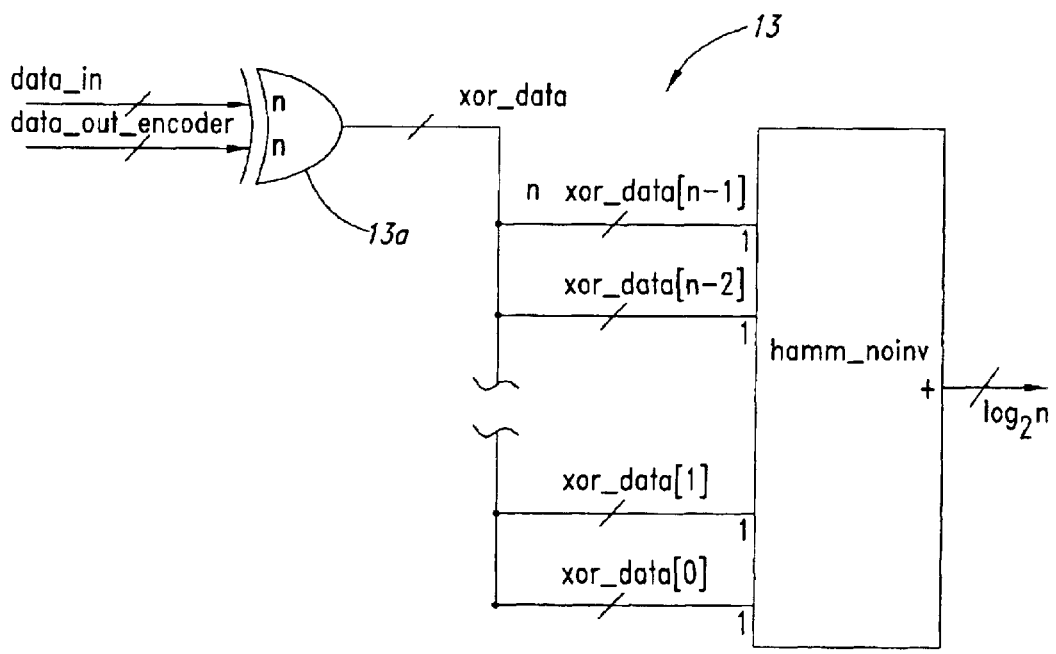

The same consideration applies basically also to the diagrams of FIGS. 6 and 7, which regard, in particular, the modules designated by 12 and 13 in FIG. 4.

In the inverting modality (module 12) the signal data_invert and the datum at output from the encoder (data_out_encoder) are taken as input signal, whereas in the non-inverting modality (module 13), instead of the signal data_invert the signal data_in is used.

In both of the cases of FIGS. 6 and 7 at input to the module 11 or 13 there is present an EX-OR block 12a, 13a designed to operate bit by bit on two inputs.

Figure 8:
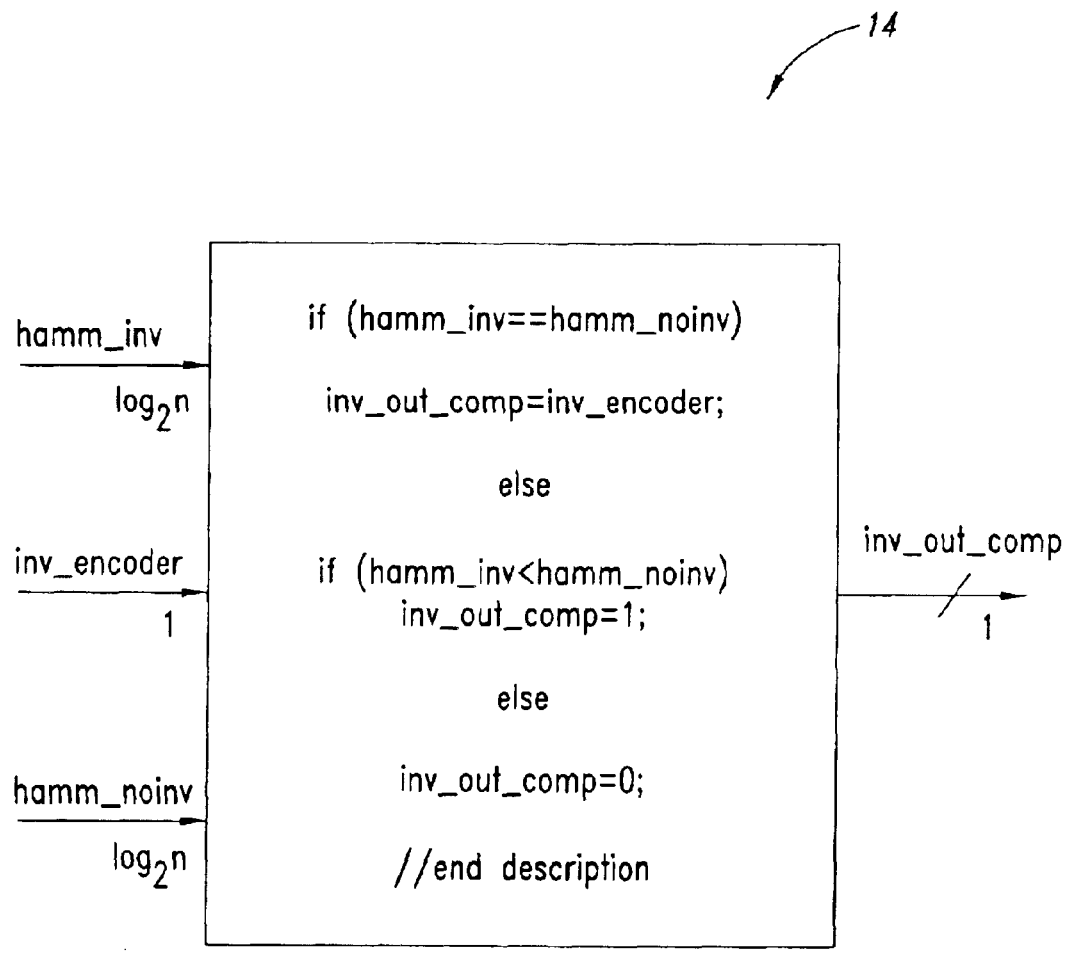

The diagram of FIG. 8, corresponding to an embodiment of the comparison module 14, is aimed at representing the two corresponding signals of hamm_inv and hamm_noinv, which arrive, respectively, from the modules 12 and 13, as well as the signal inv_encoder coming from the output of the flip-flop 16. Within the block 14 is reproduced the HDL description of the corresponding circuit.

Figure 9:
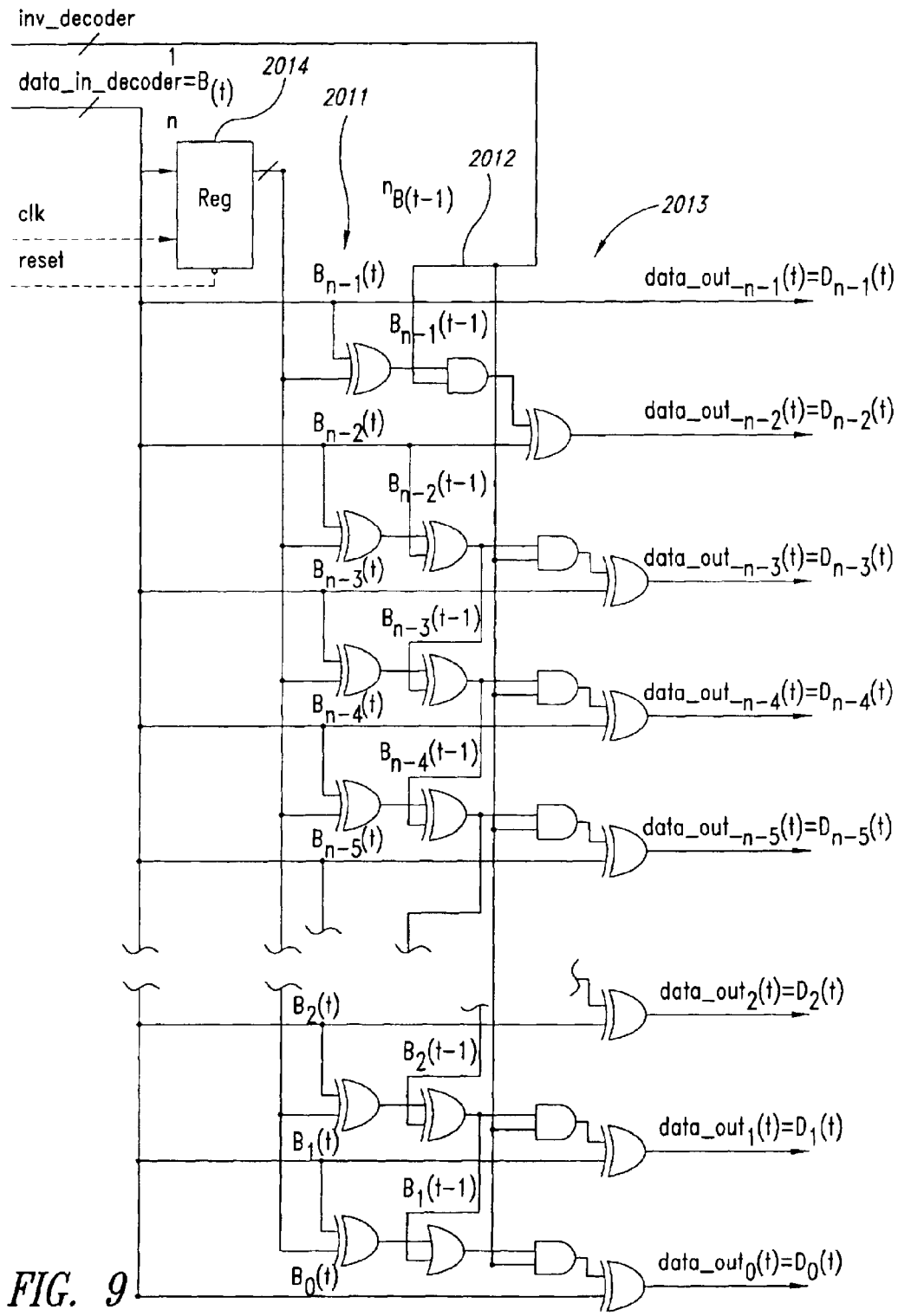
FIG. 9 represents the structure of a decoder that can be comprised in a system such as the system represented in FIG. 3.

The diagram of FIG. 9 represents, with a formalism on the whole similar to the one adopted in FIG. 5, the diagram of a decoder 20 operating according to the solution previously described with reference to FIG. 1.

Also in this case, the reference numbers 2011, 2012 and 2013 indicate respective arrays of EX-OR, NOR (and OR) logic gates, as well as of pairs of AND and EX-OR logic gates that implement the function of reconstruction of the datum transmitted D, starting from the value B sent on the bus P.

The reference 2014 likewise designates a flip-flop on which the clock signal clk and the reset signal converge. As has already been said with reference to the diagram of FIG. 5, the representation of FIG. 9, which is altogether evident for a person skilled in the sector, corresponds in actual fact to just one among a number of possible variants that is practically infinite, all of which are able to implement the same logic functions.

The diagram of FIG. 10 reproduces the structure of one embodiment of an encoder operating according to the variant described with reference to the flowchart of FIG. 2.

It will be appreciated that the diagram is substantially similar to the one represented in FIG. 4, so that elements that are identical or functionally equivalent to the ones already represented in FIG. 4 are designated with the same reference numbers, which also renders superfluous any repetition herein of the corresponding description.

Figure 10:
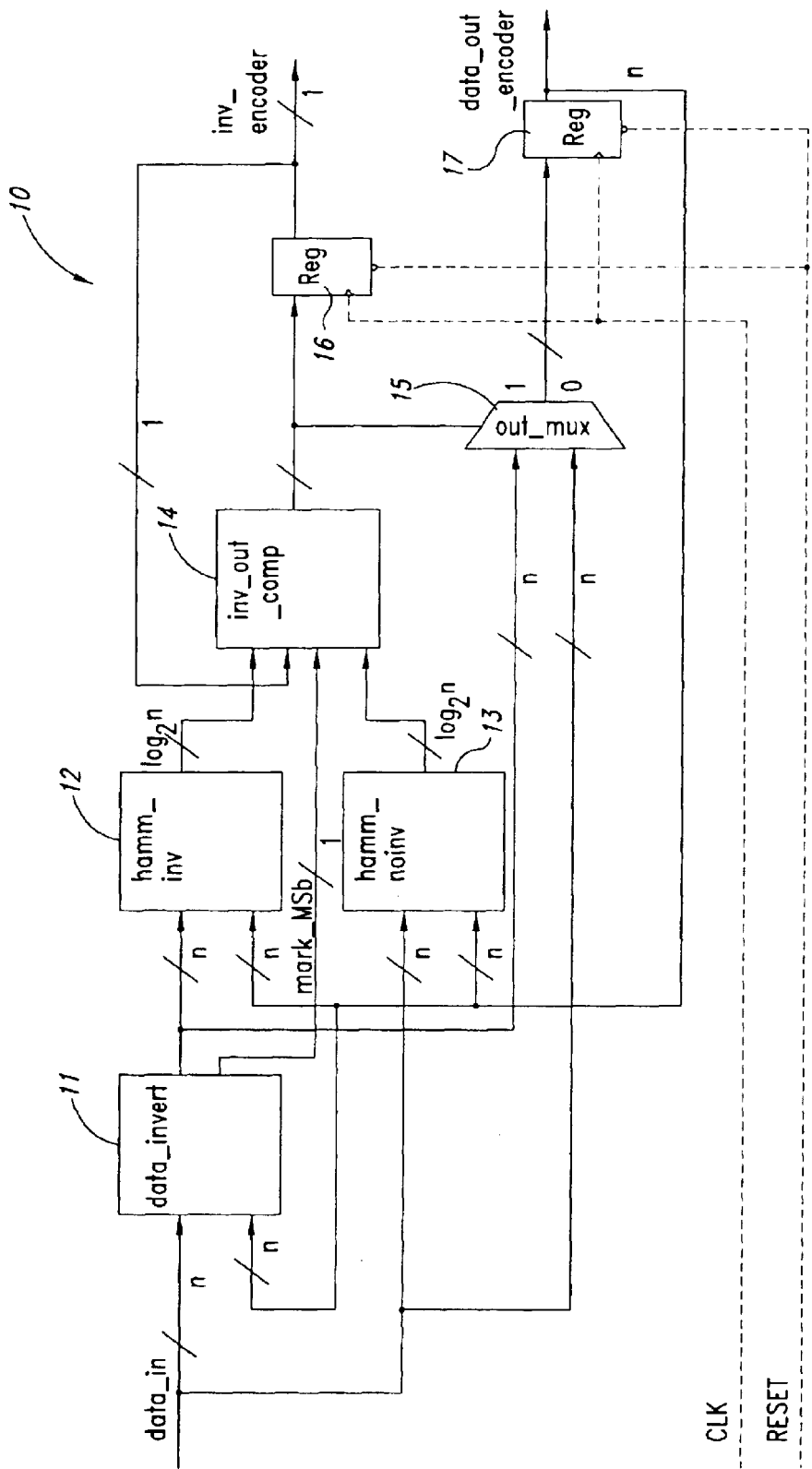
FIGS. 10 to 13 represent, resorting to representations corresponding to the representations of FIGS. 4, 5, 8 and 9, respectively, a possible variant embodiment of the invention.

The main difference between the diagram of FIG. 10 and the diagram of FIG. 4 is represented by the different structure of the module 11, which is designed to generate, in addition to the signal data_invert also the signal marc_MSb, which, transferred to the comparison block 14, is used for encoding the bit designed to convey the information INV regarding the possible recourse to the traditional bus-inverter technique, should the comparison step 106' of FIG. 2 have detected a difference (flags set in the steps 114 and 116).

Figure 11:
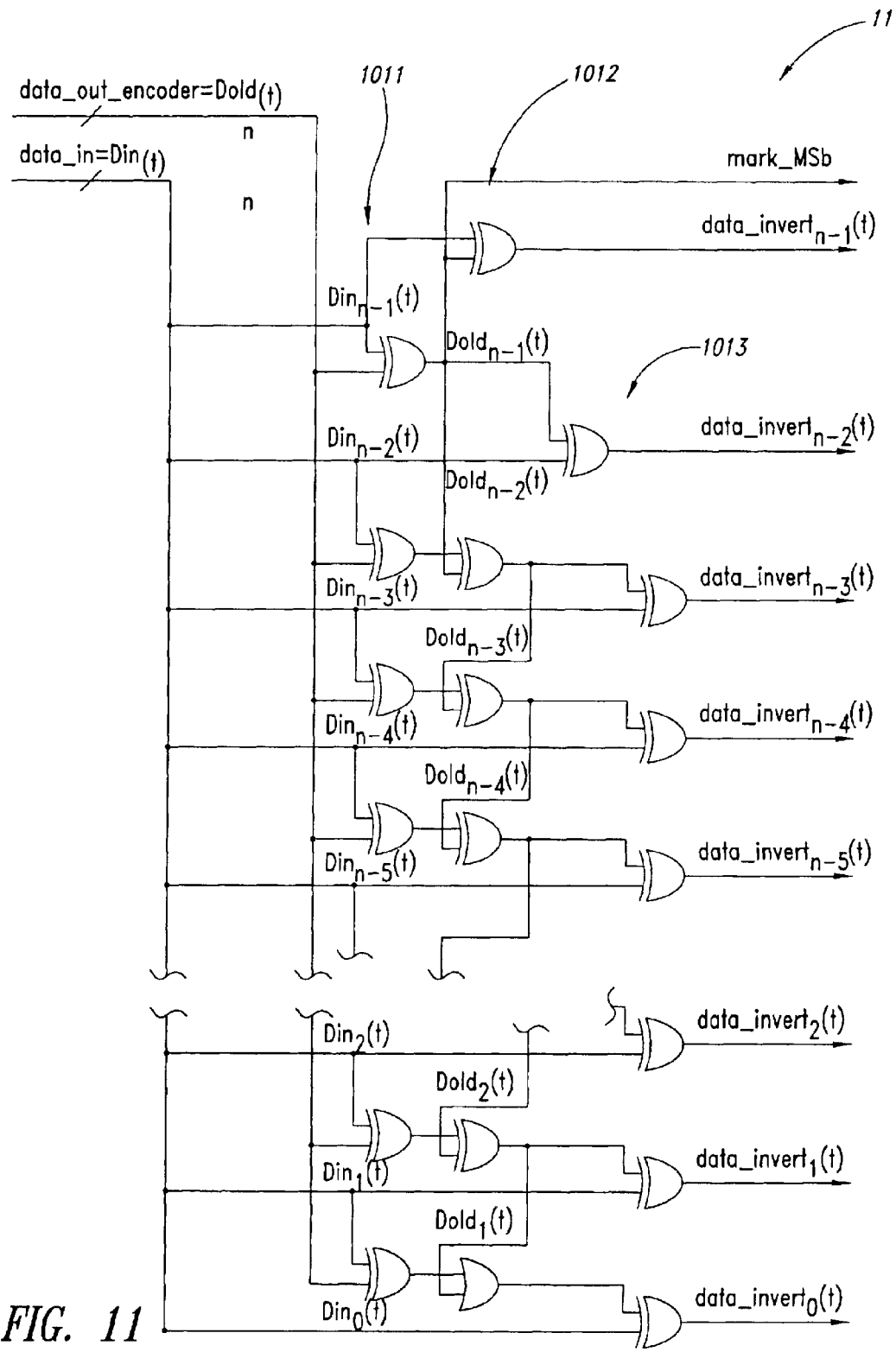
Figure 12:
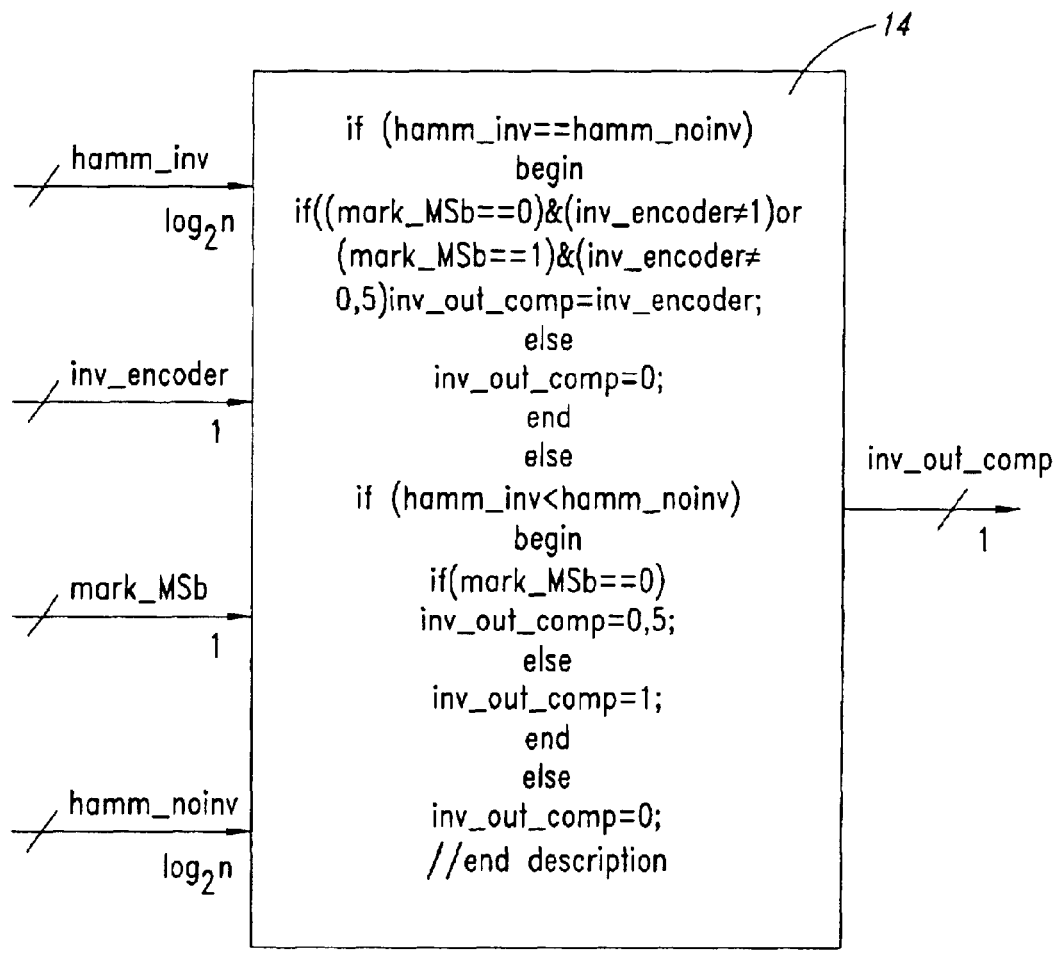
Figure 13:
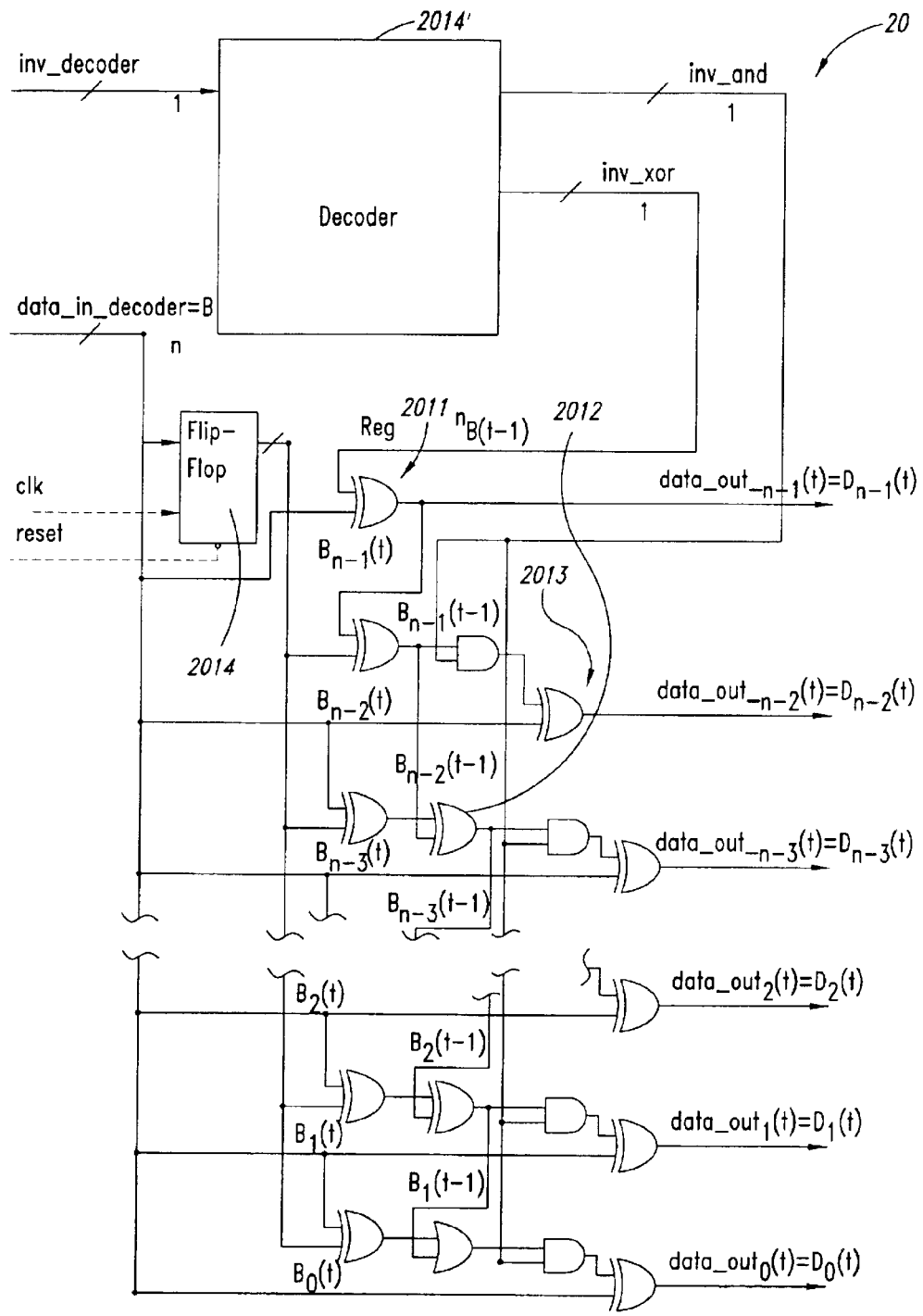

The diagrams of FIGS. 11, 12 and 13 reproduce, with a formalism altogether equivalent to the one adopted previously in FIGS. 5, 8 and 9, the structure of the module 11, as well as of the comparison module 14 and again of the corresponding decoder 20 in the case where the embodiment described in the flowchart of FIG. 2 is used. There will be noted, in the diagram of FIG. 13, the presence of an additional block, designated by 2014' and designed specifically to decode the signal INV (inv_decoder) in order to see again whether this assumes the value 0, the value 0.5 or the value 1. The implementation of such a block is evident for a person skilled in the sector after reviewing the specification.

It will moreover be appreciated that the solution described, illustrated as applied, starting from the most significant bit (MSB) of the signal D(t) and of the signal B(t-1), may be applied starting also from the least significant bit (LSB), namely starting either from the most significant bit or from the least significant bit and then proceed towards the inner bits the datum. The same technique may be also applied starting from any other bit, for example the central one, moving towards the left or towards the right, or again in both directions.

Basically, the solution described above corresponds to the identification of a subset of bits identified by a marker bit or marker, with the possibility of applying to the subset thus identified any technique for reducing the switching activity, with the added possibility, for the decoder, of identifying the marker bit, and hence the set of bits subjected to encoding precisely because the marker bit is the first bit in the orderly sequence of comparison between D(t) and B(t-1) to have been subjected to said treatment.

Further improvement of the bus-inverter technique may be achieved by redefining the output in the case where the switching activity of the encoded datum is equal to the switching activity of the non-encoded datum. This innovative solution, albeit finding a preferential application in a context such as the one described previously (use of a marker bit or marker), can be applied also to other encoding techniques, including bus-inverter (BI) techniques of a more traditional type.

In particular, the embodiment described herein detects whether the switching activity achieved by sending the encoded datum is equal to the switching activity achieved with the non-encoded datum, by sending in this case the non-encoded datum and setting the signal INV equal to 0.

In fact, if the switching activity coincides in the two cases, the global switching activity is in any case reduced if the value of the bit INV is left unaltered, i.e., if INV=0, and the non-encoded datum is sent, maintaining INV always at 0, whereas if INV is equal to 1, then the encoded datum is sent, maintaining INV always at 1.

In other words, instead of assigning to INV a value equal to 0, which may require INV to pass from 1 to 0 if its preceding value was 1, INV is left with the same value that it already had, when the datum was transmitted; consequently, since, as has already been said, the same value of SA is obtained.

Basically, the solution described may be expressed in the following terms:

$(B(t), INV(t)) = (D(t), 0)$ if $H(D(t),$ $B(t-1)) < n/2 (D(t), 0)$ if $H(D(t), B(t-1)) = n/2$ & $INV=0$ $(NOT(D(t)), 1)$ if $H(D(t), B(t-1)) = n/2$ & $INV=1$ $(NOT(D(t)), 1)$ if $H(D(t), B(t-1)) > n/2$ where B(t) designates the datum that travels on the bus at the instant t and D(t) is the datum that it is intended to send at the instant t; INV designates the value of the additional bit designed to indicate to the receiver whether the datum sent is encoded (inverted, in the example considered herein) or not, and n designates the dimension in number of bits of the bus (without additional line or bit); and the symbol NOT(.) designates the operation of encoding (inversion).

Figure 14:
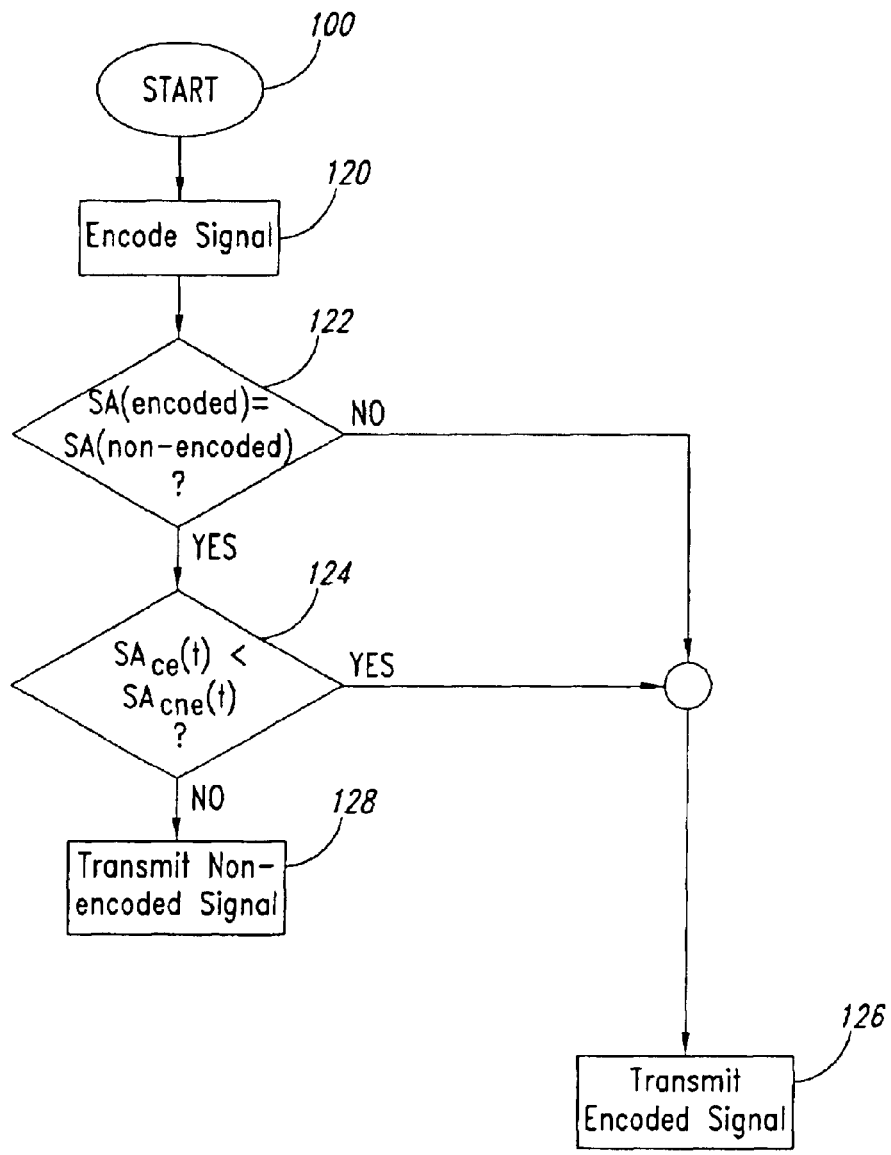
FIG. 14 is a flowchart illustrating operation of an embodiment of the invention.

FIG. 14 is a flowchart illustrating operation of an encoder in accordance with the present invention. At step 100 the process starts and proceeds to step 120. At step 120 a signal to be transmitted is encoded, for example, by using the process illustrated in FIG. 1 or the process illustrated in FIG. 2 or any other conventional encoding technique. At step 122, the switching activity associated with transmitting the signal in encoded format is compared to the switching activity associated with transmitting the signal in non-encoded format. If the switching activity associated with transmitting the signal in encoded format is equal to the switching activity associated with transmitting the signal in non-encoded format, the answer at step 122 is YES and the process proceeds to step 124. Otherwise, the answer at step 122 is NO and the system proceeds to step 126, where the signal is transmitted in an encoded format.

At step 124 the switching activity for transmitting a control signal is compared for the case where the signal to be transmitted is transmitted in an encoded format and the case where the signal to be transmitted is transmitted in a non-encoded format. If the switching activity for transmitting the control signal is greater in the case where the signal to be transmitted is transmitted in a non-encoded format, the answer at step 124 is YES and the system proceeds to step 126, where the signal is transmitted in an encoded format. Otherwise, the answer at step 124 is NO and the system proceeds to step 128, where the signal is transmitted in non-encoded format.

Of course, without prejudice to the principle of the invention, the details of implementation and the embodiments may be amply varied with respect to what is described and illustrated herein, without thereby departing from the scope of the present invention, as defined in the attached claims.

It will be appreciated that the solutions described herein as being implementable at the level of specific hardware circuitry, are suitable also for implementation at a software level by means of processing circuits of a general-purpose type appropriately programmed with a computer product which, when run on the said hardware of a general-purpose type, determines the implementation of the solution according to the invention.

What is claimed is:

1. A process for transmitting at given instants digital signals on a bus, said digital signals being transmitted on the bus selectively in a non-encoded format and in an encoded format so as to minimize a switching activity on the bus, the process comprising:

associating to said digital signals an additional signal that is able to assume, at said given instants, different logic values according to whether the digital signal to which it is associated is transmitted in said non-encoded format and, at least in part, in said encoded format, respectively, so that said additional signal is able to modify its logic value between successive instants of said given instants;

detecting for said digital signals a condition in which transmission on said bus in said non-encoded format and in said encoded format are able to give rise to an identical switching activity on the bus; and determining whether a digital signal to be transmitted on the bus at a given instant is to be transmitted in said non-encoded format or in said at least partially encoded format so as to cause the additional signal associated to said signal to be transmitted on the bus at a given instant to keep a logic value with respect to a logic value assumed by the additional signal for transmission on the bus for a preceding instant among said given instants.

2. The process according to claim 1, wherein:

determining whether to transmit a signal on the bus in non-encoded format or in encoded format comprises comparing the signal to be transmitted on the bus for an instant of said given instants with a signal transmitted on the bus for a preceding instant among said given instants bit by bit in orderly sequence so as to identify a first set of bits that are not changed and a second set of bits at least some of which are changed; and determining whether to transmit said signal on the bus in non-encoded format and in encoded format limitedly to bits of said second set of bits.

3. The process according to claim 2, further comprising identifying, in the context of said orderly sequence, at least one marker bit that separates bits of said first set from bits of said second set.

4. The process according to claim 2 wherein the comparison bit by bit is carried out starting from a bit with a least probability of change.

5. The process according to claim 2 wherein the comparison bit by bit is carried out starting from a most significant bit.

6. The process according to claim 2 wherein the comparison bit by bit is carried out starting from a least significant bit.

7. The process according to claim 2 wherein the comparison bit by bit is carried out starting from a given bit, exploring other bits subjected to comparison moving in a given direction.

8. The process according to claim 2 wherein the comparison bit by bit is carried out starting from at least one given bit, exploring other bits subjected to comparison moving in opposite directions.

9. The process according to claim 1, further comprising transmitting, in non-encoded format, a first bit of said signal to be transmitted on the bus.

10. The process according to claim 2, further comprising encoding integrally, in view of transmission on the bus, said signal to be transmitted on the bus if said comparison operation reveals that a first bit considered in said orderly sequence is changed.

11. The process according to claim 2 wherein the first set of bits are transmitted in non-encoded format.

12. The process according to claim 1, further comprising subjecting to logic inversion the bits of the signal in non-encoded format.

13. The process according to claim 1, further comprising determining a distance between said signal to be transmitted on the bus at an instant among said given instants and the signal transmitted on the bus for the preceding instant among said given instants.

14. The process according to claim 13 wherein said distance is determined as Hamming distance.

15. An encoder for transmitting at given instants on a bus digital signals selectively in a non-encoded format and an encoded format, the encoder comprising:

a transmission-driving module for driving transmission of said signals on the bus in non-encoded format and in encoded format so as to minimize a switching activity on the bus; and a module for associating to said digital signals an additional signal that is able to assume, at said given instants, different logic values according to whether the digital signal to which it is associated is transmitted in said non-encoded format or, at least in part, in said encoded format, respectively, so that said additional signal is able to modify its logic value between successive instants of said given instants; and a module for detecting, for said digital signals a condition in which the transmission on said bus in said non-encoded format and in said encoded format are able to give rise to an identical switching activity on the bus, wherein said transmission-driving module is configured to drive transmission of said signals on the bus in said non-encoded format and in said at least in part encoded format so as to cause the additional signal associated to said signal to be transmitted on the bus at a given instant to keep its logic value with respect to a logic value assumed by the additional signal for transmission on the bus for a preceding instant among said given instants.

16. The encoder according to claim 15, further comprising:

a comparison module for comparing a signal to be transmitted on the bus for an instant of said given instants with a signal transmitted on the bus for a preceding instant among said given instants, and emitting at least one corresponding decision signal; said comparison module comprising a logic network that is able to compare bit by bit, in orderly sequence, said signal to be transmitted on the bus at an instant of said given instants and said signal transmitted on the bus for the preceding instant among said given instants, so as to identify a first set of bits that are not changed and a second set of bits at least some of which are changed; and, said transmission-driving module is configured for driving the transmission of said signals on the bus in non-encoded format and in encoded format limitedly to the bits of said second set of bits.

17. The encoder according to claim 16 wherein said logic network compares bit by bit, starting from a bit with a least probability of change.

18. The encoder according to claim 16 wherein said logic network compares bit by bit, starting from a most significant bit.

19. The encoder according to claim 16 wherein said logic network compares bit by bit, starting from a least significant bit.

20. The encoder according to claim 16 wherein said logic network compares bit by bit starting from a given bit, exploring other bits subjected to comparison, moving in a given direction.

21. The encoder according to claim 16 wherein said logic network compares bit by bit starting from at least one given bit, exploring other bits subjected to comparison, moving in opposite directions.

22. The encoder according to claim 15 wherein said transmission-driving module is configured to drive transmission of a first bit of said signal to be transmitted on the bus in non-encoded format.

23. The encoder according to claim 16 wherein said transmission-driving module is configured to drive transmission of said signal to be transmitted on the bus in integrally encoded format, if said logic network indicates that a first bit considered in said orderly sequence is changed.

24. The encoder according to claim 16 wherein said transmission-driving module is configured for transmitting on the bus said first set of bits always in non-encoded format.

25. The encoder according to claim 15, further comprising an inverter circuit for generating said encoded format_ subjecting to logic inversion the bits of the signal in non-encoded format.

26. The encoder according to claim 15, further comprising a module for calculating a distance for determining said switching activity on the bus as distance between a signal to be transmitted on the bus at an instant among said given instants and a signal transmitted on the bus for a preceding instant among said given instants.

27. The encoder according to claim 26 wherein said at least one module for calculating distance comprises at least one module for calculating a Hamming distance.

28. A decoder for receiving digital signals transmitted on a bus, comprising:
   a decoding logic to identify for each digital signal received, at least one marker bit that separates a first set of bits in a non-encoded format from a second set of bits in an encoded format; and
   a logic reconstruction network for reconverting from said encoded format to said non-encoded format the bits of said second set.

29. The decoder according to claim 28 wherein said decoding logic is able to identify said at least one marker bit as a bit of a digital signal with a least probability of change.

30. The decoder according to claim 28 wherein said decoding logic is able to identify said at least one marker bit as a most significant bit of a digital signal.

31. The decoder according to claim 28 wherein said decoding logic is able to identify said at least one marker bit as a least significant bit of a digital signal.

32. The decoder according to claim 28 wherein said decoding logic is able to identify said at least one marker bit as a starting bit for exploring a digital signal, carried out moving in a given direction.

33. The decoder according to claim 28 wherein said decoding logic is able to identify said at least one marker bit as a starting bit for exploring a digital signal, carried out moving in opposite directions.

34. The decoder according to claim 28 wherein the decoder is configured to assume as transmitted in non-encoded format a first bit of a digital signal.

35. The decoder according to claim 28 wherein the decoder is configured to assume a larger set of the first and second set of bits is transmitted in said non-encoded format.

36. The decoder according to claim 28 wherein said logic reconstruction network reconverts said digital signals from said encoded format to said non-encoded format by means of logic inversion of bits subjected to encoding.

37. A computer program product directly loadable into the memory of a computer and comprising software code portions for:
   associating with a digital signal an additional signal that is able to assume, at given instants, different logic values according to whether the digital signal to which it is associated is transmitted in a non-encoded format and, at least in part, in an encoded format, respectively, so that said additional signal is able to modify its logic value between successive instants of said given instants;
   detecting for said digital signal a condition in which transmission on said bus in said non-encoded format and in said encoded format are able to give rise to an identical switching activity on the bus; and
   determining whether a digital signal to be transmitted on the bus at a given instant is to be transmitted in said non-encoded format or in said at least partially encoded format so as to cause the additional signal associated to said signal to be transmitted on the bus at a given instant to keep a logic value with respect to a logic value assumed by the additional signal for transmission on the bus for a preceding instant among said given instants.

38. A computer program product which is directly loadable in the memory of a computer and comprising software code portions for driving transmission of signals on a bus in non-encoded format and in encoded format so as to minimize a switching activity on the bus by:
   associating to said digital signals an additional signal that is able to assume, at given instants, different logic values according to whether the digital signal to which it is associated is transmitted in said non-encoded format or, at least in part, in said encoded format, respectively, so that said additional signal is able to modify its logic value between successive instants of said given instants; and
   detecting for said digital signals a condition in which the transmission on said bus in said non-encoded format and in said encoded format are able to give rise to an identical switching activity on the bus, wherein transmission of said signals on the bus in said non-encoded format and in said at least in part encoded format is driven so as to cause the additional signal associated to said signal to be transmitted on the bus at a given instant to keep its logic value with respect to a logic value assumed by the additional signal for transmission on the bus for a preceding instant among said given instants.

39. A computer program product which is directly loadable into the memory of a computer and comprising software code portions for identifying for a digital signal received at least one marker bit that separates a first set of bits from a second set of bits; and reconverting from an encoded format to a non-encoded format only the bits of said second set.

40. A method of transmitting a signal on a bus, comprising:
   comparing a first signal activity value associated with transmitting a signal in a first format with a second signal activity value associated with transmitting the signal in a second format;
   if the first signal activity value is greater than the second signal activity value, transmitting the signal in the second format;
   if the first signal activity value is less than the second signal activity value, transmitting the signal in the first format; and
   if the first signal activity value is equal to the second signal activity value, comparing a third signal activity value associated with transmitting the signal in a first format with a fourth signal activity value associated with transmitting the signal is a second format, and if the third signal activity value is greater than the fourth signal activity value, transmitting the signal in the second format; and if the third signal activity value is less than the fourth signal activity value, transmitting the signal in the first format.

41. The method of claim 40 wherein the second format is an encoded format.

42. The method of claim 40 wherein the third signal activity value is associated with transmitting a control signal indicating the signal is being transmitted in the first format.

43. A transmitter for transmitting a signal on a bus, comprising:

a receiving module for receiving a signal to be transmitted;

a formatting module coupled to the receiving module, for formatting the received signal;

a module for calculating switching activity coupled to the receiving module and to the formatting module, for calculating first and second switching activity values associated with transmitting the received signal and third and fourth switching activity values associated with transmitting the formatted received signal;

a comparator coupled to the module for calculating switching activity for comparing the first and third switching activity values and the second and fourth switching activity values; and a driver coupled to the comparator, the receiving module and the formatting module, for driving transmission of one of the received signal and the formatted received signal, based, at least in part, on the comparisons of the first and third switching activity values and the second and fourth switching activity values.

* * * * *

UNITED STATES PATENT AND TRADEMARK OFFICE
CERTIFICATE OF CORRECTION

PATENT NO. : 6,943,706 B2
DATED : September 13, 2005
INVENTOR(S) : Francesco Pappalardo et al.

It is certified that error appears in the above-identified patent and that said Letters Patent is hereby corrected as shown below:

Title page,
Item [75], Inventors, "Giuseppe Notarangelo, Putigano (IT)" should read -- Giuseppe Notarangelo, Putignano (IT) --.

Signed and Sealed this

Seventh Day of March, 2006

JON W. DUDAS
*Director of the United States Patent and Trademark Office*